US009208958B2

(12) United States Patent
Tezuka et al.

(10) Patent No.: US 9,208,958 B2
(45) Date of Patent: Dec. 8, 2015

(54) LITHIUM ION CAPACITOR

(75) Inventors: Teruaki Tezuka, Kofu (JP); Toshihiro Hayashi, Nirasaki (JP); Nobuo Ando, Nakakoma-gun (JP); Yuu Watanabe, Hokuto (JP); Makoto Taguchi, Kai (JP); Naoshi Yasuda, Komatsu (JP)

(73) Assignee: JM Energy Corporation, Hokuto (JP)

( * ) Notice: Subject to any disclaimer, the term of this patent is extended or adjusted under 35 U.S.C. 154(b) by 203 days.

(21) Appl. No.: 14/001,965

(22) PCT Filed: Feb. 1, 2012

(86) PCT No.: PCT/JP2012/052226
§ 371 (c)(1),
(2), (4) Date: Aug. 28, 2013

(87) PCT Pub. No.: WO2012/117794
PCT Pub. Date: Sep. 7, 2012

(65) Prior Publication Data
US 2014/0002960 A1 Jan. 2, 2014

(30) Foreign Application Priority Data

Feb. 28, 2011 (JP) ................................. 2011-041443
Mar. 28, 2011 (JP) ................................. 2011-069993

(51) Int. Cl.
| | |
|---|---|
| H01G 9/00 | (2006.01) |
| H01G 11/26 | (2013.01) |
| H01G 11/06 | (2013.01) |
| H01G 11/42 | (2013.01) |
| H01G 11/50 | (2013.01) |
| H01G 11/70 | (2013.01) |
| H01G 11/28 | (2013.01) |

(52) U.S. Cl.
CPC ............. *H01G 11/26* (2013.01); *H01G 11/06* (2013.01); *H01G 11/42* (2013.01); *H01G 11/50* (2013.01); *H01G 11/70* (2013.01); *H01G 11/28* (2013.01); *Y02E 60/13* (2013.01)

(58) Field of Classification Search
USPC .......... 361/502, 503–504, 509–512, 517–519, 361/523–525, 528–529
See application file for complete search history.

(56) References Cited

U.S. PATENT DOCUMENTS

| | | | |
|---|---|---|---|
| 2007/0002524 A1* | 1/2007 | Ando et al. .................. | 361/503 |
| 2010/0027195 A1 | 2/2010 | Taguchi et al. | |
| 2010/0118469 A1 | 5/2010 | Shima et al. | |
| 2010/0142121 A1 | 6/2010 | Fujii et al. | |

FOREIGN PATENT DOCUMENTS

| | | |
|---|---|---|
| CN | 1860568 | 11/2006 |
| JP | 2002-298849 A | 10/2002 |
| JP | 2005 93779 | 4/2005 |
| JP | 2008 34304 | 2/2008 |
| JP | 2009 176786 | 8/2009 |
| JP | 2010 135649 | 6/2010 |
| JP | 2010-238680 A | 10/2010 |
| WO | 2005 031773 | 4/2005 |
| WO | WO 2008/123529 A1 | 10/2008 |

OTHER PUBLICATIONS

International Search Report Issued May 1, 2012 in PCT/JP2012/052226 Filed Feb. 1, 2012.
Japanese Office Action issued Jan. 28, 2014 in Patent Application No. 2011-069993 with English Translation.

* cited by examiner

*Primary Examiner* — Nguyen T Ha
(74) *Attorney, Agent, or Firm* — Oblon, McClelland, Maier & Neustadt, L.L.P.

(57) ABSTRACT

Provided is a lithium ion capacitor having a low internal resistance, a high energy density, and a high capacity retention rate.
The lithium ion capacitor includes a positive electrode having a positive electrode active material layer formed on a roughened positive electrode current collector, a negative electrode having a negative electrode active material layer containing graphite-based particles formed on a negative electrode current collector, and an electrolytic solution containing a solution of a lithium salt in an aprotic organic solvent, wherein the total thickness of the positive electrode active material layer is 50 μm to 140 μm, and the ratio of mass of the positive electrode active material layer to the sum of the mass of the positive electrode active material layer and that of the negative electrode active material layer is 0.4 to 0.5.

11 Claims, No Drawings

LITHIUM ION CAPACITOR

This application is a National Stage of PCT/JP12/052226 filed Feb. 1, 2012 and claims the benefit of JP 2011-041443 filed Feb. 28, 2011 and JP 2011-069993 filed Mar. 28, 2011.

TECHNICAL FIELD

The present invention relates to a lithium ion capacitor having a low internal resistance, a high energy density, and a high capacity retention rate.

BACKGROUND ART

As an accumulator device having a high power and a high energy density, attention has been recently paid to a lithium ion capacitor. However, when the conventional lithium ion capacitor has designed to have a higher energy density, the internal resistance becomes higher. Thus, a problem of trade off relationship is caused.

Patent Literature 1 discloses a lithium ion capacitor that has a lower resistance by appropriately adjusting the ratio of the weight of a positive electrode active material and that of a negative electrode active material.

However, in the lithium ion capacitor described in Patent Literature 1, the internal resistance is not sufficiently reduced. Therefore, the lithium ion capacitor satisfies neither a high power property nor a high energy density.

CITATION LIST

Patent Literature

Patent Literature 1: WO05/031773

SUMMARY OF INVENTION

Technical Problem

The present invention has been made on the basis of the foregoing circumstances and has as its object the provision of a lithium ion capacitor having a low internal resistance, a high energy density, and a high capacity retention rate.

Solution to Problem

According to the lithium ion capacitor of the present invention, there is provided a lithium ion capacitor including a positive electrode having a positive electrode active material layer formed on a roughened positive electrode current collector, a negative electrode having a negative electrode active material layer containing graphite-based particles formed on a negative electrode current collector, and an electrolytic solution containing a solution of a lithium salt in an aprotic organic solvent, wherein the total thickness of the positive electrode active material layer is 50 μm to 140 μm, and the ratio of the mass of the positive electrode active material layer to the sum of the mass of the positive electrode active material layer and that of the negative electrode active material layer is 0.4 to 0.5.

In the lithium ion capacitor of the present invention, it is preferable that the positive electrode current collector is roughened by etching, more preferably by electrolytic etching.

When the negative electrode and/or the positive electrode are/is doped with lithium ions and the positive electrode and the negative electrode are then short-circuited, the potential of the positive electrode is preferably 0.5 to 1.5 V.

In the lithium ion capacitor of the present invention, it is preferable that the graphite-based particles used in the negative electrode active material layer are at least one selected from graphite-based composite particles in which an artificial graphite particle, natural graphite, or graphite powder is coated with a material derived from tar or pitch.

It is preferable that the aprotic organic solvent is a mixed solvent of ethylene carbonate, ethyl methyl carbonate, and dimethyl carbonate, and the ratio of the volume of ethylene carbonate to the sum of the volume of ethyl methyl carbonate and that of dimethyl carbonate is 1:3 to 1:1. In the aprotic organic solvent, the ratio of the volume of ethyl methyl carbonate to that of dimethyl carbonate is more preferably 1:1 to 9:1.

Advantageous Effects of Invention

According to the present invention, there is provided a lithium ion capacitor having a low internal resistance, a high energy density, and a high capacity retention rate.

DESCRIPTION OF EMBODIMENTS

Hereinafter, embodiments of a lithium ion capacitor of the present invention will be described in detail.

The lithium ion capacitor of the present invention generally has an electrode unit formed by alternately stacking or winding a positive electrode and a negative electrode through a separator, in an outer container. No particular limitation is imposed on the outer container, and as the outer container, may be used a cylindrical, a rectangular, or a laminated outer container.

Herein, "doping" means occluding, adsorbing, or inserting, and roughly represents a phenomenon in which at least one of a lithium ion and an anion enters into a positive electrode active material or a phenomenon in which a lithium ion enters into a negative electrode active material. Further, "dedoping" means deoccluding or releasing, and represents a phenomenon in which a lithium ion or an anion is deoccluded from a positive electrode active material or a phenomenon in which a lithium ion is deoccluded from a negative electrode active material.

As a method for doping at least one of a negative electrode and a positive electrode with lithium ions in advance, may be used a method in which a lithium ion supply source such as metallic lithium is disposed as a lithium electrode in a capacitor cell and at least one of a negative electrode and a positive electrode is brought into electrochemical contact with the lithium ion supply source to be doped with lithium ions.

In the lithium ion capacitor according to the present invention, when a lithium electrode is locally disposed in the cell and brought into electrochemical contact with at least one of a negative electrode and a positive electrode, at least one electrode can be uniformly doped with lithium ions.

Even when an electrode unit having a large capacity is configured by stacking or winding a positive electrode and a negative electrode or a lithium electrode is disposed on the outer circumference or the outermost layer of the electrode unit, at least one of the negative electrode and the positive electrode can be smoothly and uniformly doped with lithium ions.

In the lithium ion capacitor according to the present invention, an electrode unit is configured, for example, by winding or stacking a positive electrode having a positive electrode active material layer formed on a positive electrode current collector, a first separator, a negative electrode having a negative electrode active material layer formed on a negative electrode current collector, and a second separator in this order; disposing at least one lithium ion supply source in a remaining portion of the first separator so as not to come into contact with the positive electrode; and short-circuiting the negative electrode current collector and the lithium ion supply source. The electrode unit is enclosed with a rectangular, cylindrical, or laminated outer container. An electrolytic solution is then injected into the outer container to initiate doping by the lithium electrode, whereby the negative electrode active material layer can be doped with lithium ions. As a result, the lithium ion capacitor has such a constitution.

Hereinafter, each component constituting the lithium ion capacitor according to the present invention will be described.

[Current Collector]

The positive electrode and the negative electrode have a positive electrode current collector and a negative electrode current collector, respectively, that each supply or receive electricity. As the positive electrode current collector and the negative electrode current collector, a current collector having through-holes is preferably used. The shape and number of the through-holes in the positive electrode current collector and the negative electrode current collector are not particularly limited and may be set so that a lithium ion that is electrochemically supplied by a lithium electrode disposed opposite to at least one of the positive electrode and the negative electrode and a lithium ion in the electrolytic solution can move between front and back surfaces of the electrodes without being interrupted by the respective electrode current collectors.

[Positive Electrode Current Collector]

A positive electrode current collector that has been roughened is used. The positive electrode current collector obtained by roughening has irregularities or through-holes on the surface. The presence of the irregularities or the through-holes increases a contact area with an active material, and therefore the contact resistance can be reduced. The roughening can be performed by etching, ashing, or plasma treatment. In the present invention, it is preferable that the positive electrode current collector is roughened by etching, particularly preferably by electrolytic etching. Further, the positive electrode current collector particularly preferably has irregularities.

As the positive electrode current collector, may be used a positive electrode current collector having through-holes formed by a through-hole formation process other than roughening, for example, one having through-holes passing through from a front surface to a back surface formed by mechanical punching (for example, expanded metal and punching metal), or one having through-holes passing through from a front surface to a back surface formed by laser processing with $CO_2$ laser, YAG laser, or UV laser. The through-hole formation process may be performed before or after roughening.

Herein, the irregularities and the through-holes formed in the positive electrode current collector are collectively referred to as "voids."

Further, the abundance of the irregularities and the through-holes formed in the positive electrode current collector by electrolytic etching or the like is referred to as a void ratio in the present description. Moreover, "irregularities" show non through-holes that are irregular and are formed in the positive electrode current collector.

The void ratio (%) can be calculated by an expression (1) described below.

void ratio(%)=[(weight of untreated positive electrode current collector(g)−weight of positive electrode current collector after electrolytic etching(g))/ weight of untreated positive electrode current collector(g)]×100    Expression (1):

As a material for the positive electrode current collector, may be used aluminum or stainless steel. In particular, aluminum is preferred. The thickness of the positive electrode current collector is not particularly limited, and may be generally 1 to 50 μm, preferably 5 to 40 μm, particularly preferably 10 to 40 μm.

As a method for forming irregularities and through-holes in the positive electrode current collector, may be adopted the above-described roughening process and through-hole formation process. Etching is preferably used, and use of electrolytic etching is particularly preferred. As an etching solvent, an acid such as hydrochloric acid may be adopted. Process conditions of etching include an electric current waveform, a composition and a temperature of a liquid, and the like. Since the shape of through-holes varies according to the conditions, optimization is appropriately needed so that the intended shape is achieved. The hole diameter of the through-holes of the positive electrode current collector is 1 to 500 μm, preferably 5 to 300 μm, particularly preferably 10 to 300 μm.

The void ratio (%) of the positive electrode current collector is preferably 5 to 60%, more preferably 5 to 50%.

The porosity (%) of the positive electrode current collector is preferably 20 to 50%, more preferably 20 to 40%. The porosity (%) of the positive electrode current collector can be calculated by an expression (2) described below; provided that a value of the expression (2) includes a void ratio calculated by the expression (1) described above. The absolute value of only a porosity (%) can be calculated from a difference between the expressions (1) and (2).

porosity(%)=[1−(mass of positive electrode current collector/true specific gravity of positive electrode current collector)/(apparent volume of positive electrode current collector)]×100    Expression (2):

[Positive Electrode Active Material]

As a positive electrode active material, may be used a substance capable of being reversibly doped or dedoped with lithium ions and at least one type of anions such as tetrafluoroborate. Examples thereof may include active carbon powder. The specific surface area of active carbon is preferably 1,900 m$^2$/g to 2,800 m$^2$/g, more preferably 1,950 m$^2$/g to 2,600 m$^2$/g. The diameter of 50% accumulated volume (D50) (average particle diameter) of active carbon is preferably 2 μm to 8 μm, particularly preferably 2 μm to 5 μm from the viewpoint of packing density of the active carbon. When the specific surface area and the diameter of 50% accumulated volume (D50) of active carbon fall within the above-described ranges, the energy density of a lithium ion capacitor can be further improved. Here, the diameter of 50% accumulated volume (D50) can be determined, for example, by a microtrac method.

[Positive Electrode Active Material Layer]

A positive electrode active material is attached to a positive electrode current collector by coating, printing, injection, spraying, vapor deposition, or bonding under pressure, to form a positive electrode active material layer. The thickness of one side of the positive electrode active material layer may be 25 to 70 preferably 25 to 60 more preferably 25 to 50 μm. When the thickness of the positive electrode active material layer falls within the above-described range, the diffusion resistance of ions that move in the positive electrode active material layer can be reduced, and therefore the internal resistance can be reduced.

[Negative Electrode Current Collector]

As a negative electrode current collector, may be used stainless steel, copper, or nickel. The thickness of the negative electrode current collector is not particularly limited, and may be generally 1 to 50 µm, preferably 5 to 40 µm, particularly preferably 10 to 30 µm.

As a method for forming through-holes in a negative electrode current collector, may be adopted the method for forming through-holes in a positive electrode current collector, that is, a method including the roughening process and the through-hole formation process. Since the shape of through-holes varies depending on the forming method, optimization is appropriately needed so that the intended shape is achieved. The pore diameter of the through-holes of the negative electrode current collector is 0.5 to 50 µm, preferably 0.5 to 30 µm, particularly preferably 0.5 to 20 µm.

The porosity (%) of the through-holes of the negative electrode current collector is preferably 20 to 60%, more preferably 20 to 50%. The porosity (%) of the negative electrode current collector can be calculated by an expression (3) described below.

$$\text{porosity}(\%)=[1-(\text{mass of negative electrode current collector/true specific gravity of negative electrode current collector})/(\text{apparent volume of negative electrode current collector})]\times 100 \quad \text{Expression (3):}$$

[Negative Electrode Active Material]

As a negative electrode active material, graphite-based particles may be used among substances capable of being reversibly doped or dedoped with lithium ions. Specific examples thereof may include graphite-based composite particles in which the surface of artificial graphite or natural graphite is coated with a graphitizing substance derived from tar or pitch.

In the present invention, as the negative electrode active material, graphite-based composite particles are particularly preferably used. The use of graphite-based composite particles as the negative electrode active material can suppress decomposition of specific electrolytic solution described below (for example, propylene carbonate). When the surface of graphite is coated with tar or pitch, a plurality of fine particles can be compacted to form a large lump as a composite particle. Therefore, the negative electrode active material is unlikely to slide down off a current collector, and is likely to be held as an electrode, and low resistance and high durability can be achieved.

Such graphite-based composite particles can be obtained, for example, by a method (1) or (2) described below.

(1) A method in which the surface of graphite is coated with tar or pitch and heat-treated to combine the graphite with a graphitizing substance derived from tar or pitch on the surface (hereinafter, graphite-based composite particles obtained by this method are referred to as "graphite-based composite particles (1)")

(2) A method in which natural graphite or artificial graphite, a low-crystalline carbon powder, and a binder are mixed, and the mixture is fired at 800° C. or lower, pulverized, and fired at 900 to 1,500° C. again (hereinafter, graphite-based composite particles obtained by this method are referred to as "graphite-based composite particles (2)")

Examples of the low-crystalline carbon powder in the (2) method may include mesophase pitch, raw cokes, and calcined cokes. Examples of the binder may include a binder pitch and a phenol resin.

In such graphite-based composite particles, the presence or absence of a coating formed by a graphitizing substance derived from tar or pitch on the surface of graphite particles can be confirmed by measurement of Raman spectra or XRD.

From the viewpoint of improvement of power, it is preferable that graphite-based composite particles having a particle size that satisfies a diameter of 50% accumulated volume (D50) within a range of 1.0 to 10 µm, more preferably within a range of 2 to 5 µm are used as the negative electrode active material. The production of graphite-based composite particles having a diameter of 50% accumulated volume (D50) of less than 1.0 µm is difficult. When graphite-based composite particles have a diameter of 50% accumulated volume (D50) of more than 10 µm, a lithium ion capacitor having a sufficiently small internal resistance is unlikely to be obtained. The specific surface area of the negative electrode active material is preferably 0.1 to 200 m$^2$/g, more preferably 0.5 to 50 m$^2$/g. When the specific surface area of the negative electrode active material is less than 0.1 m$^2$/g, the resistance of the lithium ion capacitor to be obtained is high. On the other hand, when the specific surface area of the negative electrode active material is more than 200 m$^2$/g, the irreversible capacity of the lithium ion capacitor to be obtained during charging is high.

The diameter of 50% accumulated volume (D50) of graphite-based composite particles herein is a value determined by the microtrac method, for example.

[Negative Electrode Active Material Layer]

A negative electrode active material is attached to a negative electrode current collector by coating, printing, injection, spraying, vapor deposition, or bonding under pressure, to form a negative electrode active material layer. A preferable range of thickness of the negative electrode active material layer varies according to a balance of the mass of a positive electrode active material layer. The thickness of one side of the negative electrode active material layer may be 10 to 80 µm, preferably 10 to 65 µm, more preferably 10 to 50 µm. When the thickness of the negative electrode active material layer falls within the above-described range, a necessary capacity of a negative electrode can be achieved and the diffusion resistance of ions that move in the negative electrode active material layer can be reduced. Therefore, the internal resistance can be reduced.

[Binder]

A positive electrode having the above-described positive electrode active material layer and a negative electrode having the negative electrode active material layer can be produced in accordance with known methods commonly used.

For example, each electrode (positive electrode or negative electrode) can be produced by a method of mixing each active material powder (positive electrode active material or negative electrode active material), a binder, and if necessary, a conductive material and a thickener such as carboxymethyl cellulose (CMC) in water or an organic solvent, and applying the resulting slurry to a current collector, or forming a sheet of the slurry and attaching the sheet to a current collector.

In the production of each of the electrodes, as the binder, may be used a rubber-type binder such as SBR, a fluorine-containing resin obtained by seed polymerization of polyethylene tetrafluoride or polyvinylidene fluoride with an acrylic resin, or an acrylic resin.

Examples of the conductive material may include acetylene black, ketjen black, graphite, and metal powder.

The amount of each of the binder and the conductive material that are added varies according to the electric conductivity of the used active material and the shape of the produced electrode. In general, the amounts thereof are each preferably 2 to 20% by mass based on the active material.

In the lithium ion capacitor of the present invention, the ratio of the mass of the positive electrode active material layer to the sum of the mass of the positive electrode active material layer and that of the negative electrode active material layer (hereinafter referred to as "positive electrode ratio") is calculated by an expression (4) described below, and falls within a range of 0.4 to 0.5.

positive electrode ratio=(mass of positive electrode active material layer)/((mass of positive electrode active material layer)+(mass of negative electrode active material layer))   Expression (4):

When the positive electrode ratio is less than 0.4, a high energy density is unlikely to be obtained. Since the potential of the positive electrode at the later stage of discharging is low, the capacity retention rate after a charge and discharge cycle test may be decreased and the resistance increase rate may be increased. On the other hand, when the positive electrode ratio is more than 0.5, a high energy density can be obtained, but the capacity per unit weight of the negative electrode is large. Therefore, a load on the negative electrode may be increased, the capacity retention rate after a charge and discharge cycle test may be decreased and the resistance increase rate may be increased.

[Separator]

As a separator in the lithium ion capacitor of the present invention, may be used a material having an air permeability that is measured by a method in accordance with JIS P8117 within a range of 1 to 200 sec. Specifically, may be used a material appropriately selected from non-woven fabrics and fine porous membranes that are made of polyethylene, polypropylene, polyester, cellulose, polyolefin, and cellulose/rayon. In particular, a non-woven fabric made of polyethylene, polypropylene or cellulose/rayon is preferably used.

For example, the thickness of the separator is 1 to 100 μm, preferably 5 to 50 μm.

[Electrolytic Solution]

As an electrolytic solution in the lithium ion capacitor of the present invention, an electrolyte solution of a lithium salt in an aprotic organic solvent may be used.

[Aprotic Organic Solvent in Electrolytic Solution]

Examples of an aprotic organic solvent constituting the electrolytic solution may include cyclic carbonates such as ethylene carbonate (hereinafter also referred to as "EC"), propylene carbonate (hereinafter also referred to as "PC"), and butylene carbonate; and linear carbonates such as dimethyl carbonate (hereinafter also referred to as "DMC"), ethyl methyl carbonate (hereinafter also referred to as "EMC"), diethyl carbonate (hereinafter also referred to as "DEC"), and methylpropyl carbonate. Among them, a mixed solvent of two or more types thereof may be used. In particular, a mixture of a cyclic carbonate and a linear carbonate is preferably used since an electrolytic solution having a low viscosity, a high degree of dissociation, and a high ionic conductivity can be obtained.

Specific examples of the mixed solvent may include a mixed solvent of EC, PC, and DEC, a mixed solvent of EC and DEC, and a mixed solvent of EC, EMC, and DMC.

The ratio of the mass of the cyclic carbonate to that of the linear carbonate in such a mixed solvent is preferably 1:99 to 80:20, more preferably 10:90 to 60:40.

In particular, it is preferable that the ratio of the volume of EC to the total volume of EMC and DMC (hereinafter also referred to as "EMC/DMC") is 1:3 to 1:1 and the ratio of the volume of EMC to that of DMC is 1:1 to 9:1.

In the volume ratio of EC to EMC/DMC in the aprotic organic solvent, when the ratio of EC is too small, the conductivity of the electrolytic solution becomes small and the power property is lowered. Therefore, this is not preferable. On the other hand, when the ratio of EC is too large, the viscosity of the electrolytic solution becomes high, and the low-temperature property, particularly temperature dependency of internal resistance is deteriorated. Therefore, this is not preferable.

Further, in the volume ratio of EMC to DMC, when the ratio of EMC is too small, the stability of the electrolytic solution at a low temperature is reduced, and the electrolytic solution is easily frozen. Therefore, this is not preferable. On the other hand, when the ratio of EMC is too large, the stability of the electrolytic solution at a low temperature is lowered and the electrolytic solution is easily frozen similarly. In addition, a problem such as an increase in internal resistance may be caused. Therefore, this is not preferable.

As the organic solvent constituting the electrolytic solution in the present invention, may be used an organic solvent excluding cyclic carbonates and linear carbonates, for example, an organic solvent optionally containing cyclic ester such as γ-butyrolactone, a cyclic sulfone such as sulfolane, a cyclic ether such as dioxolane, a linear carboxylate such as ethyl propionate, or a linear ether such as dimethoxyethane.

[Electrolyte]

Examples of the lithium salt as an electrolyte in the electrolytic solution may include $LiClO_4$, $LiAsF_3$, $LiBF_4$, $LiPF_6$, $Li(C_2F_5SO_2)_2$ and $LiN(CF_3SO_2)_2$. In particular, $LiPF_6$ is suitably used since it has a high ion conductivity and a low resistance. Since a low internal resistance can be obtained, the concentration of lithium salt in the electrolytic solution is preferably 0.1 mol/L or more, more preferably 0.5 to 1.5 mol/L.

In the lithium ion capacitor according to the present invention, when the negative electrode and/or the positive electrode is doped with lithium ions and the positive electrode and the negative electrode are then short-circuited, the potential of the positive electrode is preferably 0.5 to 1.5 V. The potential of the positive electrode after the positive electrode and the negative electrode are short-circuited means a potential of the positive electrode determined by a method (X) or (Y), which will be described below.

(X) After doping with lithium ions is performed, the capacitor is allowed to stand for 12 hours or more while a positive electrode terminal of the capacitor is directly connected to a negative electrode terminal via a lead, and the short-circuiting is then released. Within 0.5 to 1.5 hours after the releasing, the potential of the positive electrode is measured.

(Y) After the capacitor is discharged to 0 V at a constant current over 12 hours or more with a charge and discharge test machine, it is allowed to stand for 12 hours or more while a positive electrode terminal is connected to a negative electrode terminal via a lead, and the short-circuiting is then released. Within 0.5 to 1.5 hours after the releasing, the potential of the positive electrode is measured.

[Structure of Lithium Ion Capacitor]

Examples of structure of the lithium ion capacitor according to the present invention may include a wound-type capacitor in which band-shaped positive electrode and negative electrode are wound through a separator, a laminated-type capacitor in which plate-shaped or sheet-shaped positive electrode and negative electrode are stacked through a separator and the number of each layer is three or more, and a laminated-type capacitor in which a unit having such a stacked configuration is enclosed with an outer film or a rectangular outer can.

These capacitor structures have been known by Japanese Patent Application Laid-Open No. 2004-266091, and the like, and are the same as in the configurations of capacitors described in Japanese Patent Application Laid-Open No. 2004-266091, and the like.

EXAMPLES

Hereinafter, the present invention will be more specifically described with reference to Examples, but the present invention is not limited to the Examples.

Example 1

S1

(1) Production of Positive Electrode

A conductive paint was applied to both surfaces of a material for a current collector that was an electrolytically etched aluminum foil having pores with a pore diameter of 1 μm, a void ratio after roughening of 11%, and a thickness of 30 μm amusing a double-sided vertical die coater under coating conditions of a coating width of 60 mm and a coating rate of 8 m/min so that the target value of total thickness of a coating on both the surfaces was set to 10 μm. The coating was dried under reduced pressure at 200° C. for 24 hours to form a conductive layer on the front surface and the back surface of a positive electrode current collector.

A slurry containing a positive electrode active material including active carbon particles with a diameter of 50% accumulated volume (D50) of 3 μm was applied to the conductive layer formed on each of the front surface and the back surface of the positive electrode current collector using a double-sided vertical die coater under coating conditions of a coating rate of 8 m/min so that the target value of total thickness of a coating on both the surfaces was set to 50 μm. The coating was dried under reduced pressure at 200° C. for 24 hours to form a positive electrode active material layer that was an electrode layer on each conductive layer.

The resulting material in which the conductive layer and the electrode layer were stacked on a portion of a precursor of the positive electrode current collector was cut into a size of 60 mm×85 mm so that a portion where the conductive layer and the electrode layer were stacked (hereinafter referred to as "coating portion" in a positive electrode) had a size of 60 mm×70 mm and a portion where no layer was formed (hereinafter referred to as "non-coating portion" in the positive electrode) had a size of 60 mm×15 mm, to produce a positive electrode in which the electrode layer was formed on both the surfaces of the positive electrode current collector.

(2) Production of Negative Electrode

A slurry containing a negative electrode active material including graphite-based composite particles (1), in which the surface of graphite with a diameter of 50% accumulated volume (D50) of 2 μm was coated with pitch, and an SBR binder (manufactured by JSR Corporation: TRD2001) was applied to both surfaces of a negative electrode current collector made of copper expanded metal having through-holes with a diameter of 28 μm, a porosity of 55%, and a thickness of 25 μm (manufactured by NIPPON METAL INDUSTRY CO., LTD) using a double-sided vertical die coater under coating conditions of a coating width of 65 mm and a coating rate of 8 m/min so that the target value of total thickness of a coating on both the surfaces was set to 45 μm. The coating was dried under reduced pressure at 200° C. for 24 hours to form a negative electrode active material layer that was an electrode layer on the front surface and the back surface of the negative electrode current collector.

The resulting material in which the electrode layer was formed on a portion of the negative electrode current collector was cut into a size of 65 mm×87 mm so that a portion where the electrode layer was formed (hereinafter referred to as "coating portion" in a negative electrode) had a size of 65 mm×72 mm and a portion where no electrode layer was formed (hereinafter referred to as "non-coating portion" in the negative electrode) had a size of 65 mm×15 mm, to produce a negative electrode in which the electrode layer was formed on both the surfaces of the negative electrode current collector.

(3) Production of Separator

A film that was made of a cellulose/rayon composite material and had a thickness of 35 μm and an air permeability of 100 sec was cut into a size of 67 mm×90 mm to produce a separator.

(4) Production of Lithium Ion Capacitor Component

At first, 10 pieces of positive electrodes, 11 pieces of negative electrodes, and 22 pieces of separators were prepared, and were stacked in the order of separator, negative electrode, separator, and positive electrode so that the positive electrode and the negative electrode were arranged so as to overlap the coating portions thereof but were arranged on the opposite side of each other so as not to overlap the non-coating portions thereof. Four sides of the resulting stack were fixed by a tape to produce an electrode stack unit.

A lithium electrode in a foil form with a thickness of 100 μm was cut and bonded with a copper expanded metal with a thickness of 25 μm (manufactured by NIPPON METAL INDUSTRY CO., LTD) under a pressure to produce a lithium ion supply member. The lithium ion supply member was disposed opposite to the negative electrode on the upper side of the electrode stack unit.

The non-coating portion of each of 10 pieces of the positive electrodes in the electrode stack unit produced and a power supply tab for a positive electrode that was made of aluminum with a width of 50 mm, a length of 50 mm, and a thickness of 0.2 mm and in which a sealant film had been heat-fused to the sealed portion in advance were overlapped each other and welded. A power supply tab for a negative electrode that was made of copper with a width of 50 mm, a length of 50 mm, and a thickness of 0.2 mm and in which a sealant film had been heat-fused to the sealed portion in advance was overlapped with each of the non-coating portion of each of 11 pieces of the negative electrodes in the electrode stack unit and each lithium ion supply member, and they were welded.

(5) Production of Lithium Ion Capacitor

One outer film in which a polypropylene layer, an aluminum layer, and a nylon layer were stacked, the dimension was 90 mm in length, 117 mm in width, and 0.15 mm in thickness, and the central portion was subjected to drawing into a size of 70 mm in length and 97 mm in width was produced, and another outer film in which a polypropylene layer, an aluminum layer, and a nylon layer were stacked and the dimension was 90 mm in length, 117 mm in width, and 0.15 mm in thickness was produced.

The electrode stack unit was disposed at a position forming a housing portion on the other outer film so that the positive electrode terminal and the negative electrode terminal were each projected outside from the end portion of the other outer film, and the electrode stack unit and one outer film were overlapped. Subsequently, three sides (including two sides in which the positive electrode terminal and the negative electrode terminal were projected) in each outer peripheral edge portion of the outer film and the other outer film were heat-fused.

In addition, an electrolytic solution containing 1.2 mol/L LiPF$_6$ was prepared using a mixed solvent of ethylene carbonate, propylene carbonate, and diethyl carbonate (volume ratio was 3:1:4) as an aprotic organic solvent.

The electrolytic solution was injected between the outer film and the other outer film, and the side left in the outer peripheral edge portion of the outer film and the other outer film were heat-fused.

As described above, a laminated outer lithium ion capacitor for a test (hereinafter referred to as "cell S1") was produced. After short-circuiting, the potential of the positive electrode of the cell S1 was measured as follows. Specifically, after doping with lithium ions, the cell S1 was allowed to stand for 12 hours or more while the positive electrode terminal of the cell S1 was directly connected to the negative electrode terminal via a lead, and the short-circuiting was then released. One hour after the releasing, the potential of the positive electrode was measured. The measurement method was based on the method (X) described above. The total thickness of the positive electrode active material layer, the total thickness of the negative electrode active material layer, the positive electrode ratio, and the potential of the positive electrode after short-circuiting of the resulting cell S1 are shown in Table 1 described below.

Example 2

S2

A laminated outer lithium ion capacitor for a test (hereinafter referred to as "cell S2") was produced in the same manner as in Example 1 except that the target value of total thickness of a coating of slurry containing a negative electrode active material on both the surfaces was changed from 45 μm into 30 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S2 are shown in Table 1 described below.

Example 3

S3

A laminated outer lithium ion capacitor for a test (hereinafter referred to as "cell S3") was produced in the same manner as in Example 1 except that the target value of total thickness of a coating of slurry containing a positive electrode active material on both the surfaces was changed from 50 μm into 80 μm in the production of a positive electrode and the target value of total thickness of a coating of slurry containing a negative electrode active material on both the surfaces was changed from 45 μm into 60 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S3 are shown in Table 1 described below.

Example 4

S4

A laminated outer lithium ion capacitor for a test (hereinafter referred to as "cell S4") was produced in the same manner as in Example 1 except that the target value of total thickness of a coating of slurry containing a positive electrode active material on both the surfaces was changed from 50 μm into 80 μm in the production of a positive electrode and the target value of total thickness of a coating of slurry containing a negative electrode active material on both the surfaces was changed from 45 μm into 50 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S4 are shown in Table 1 described below.

Example 5

S5

A laminated outer lithium ion capacitor for a test (hereinafter referred to as "cell S5") was produced in the same manner as in Example 1 except that the target value of total thickness of a coating of slurry containing a positive electrode active material on both the surfaces was changed from 50 μm into 110 μm in the production of a positive electrode and the target value of total thickness of a coating of slurry containing a negative electrode active material on both the surfaces was changed from 45 μm into 85 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S5 are shown in Table 1 described below.

Example 6

S6

A laminated outer lithium ion capacitor for a test (hereinafter referred to as "cell S6") was produced in the same manner as in Example 1 except that the target value of total thickness of a coating of slurry containing a positive electrode active material on both the surfaces was changed from 50 μm into 110 μm in the production of a positive electrode and the target value of total thickness of a coating of slurry containing a negative electrode active material on both the surfaces was changed from 45 μm into 70 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S6 are shown in Table 1 described below.

Example 7

S7

A laminated outer lithium ion capacitor for a test (hereinafter referred to as "cell S7") was produced in the same manner as in Example 1 except that the target value of total thickness of a coating of slurry containing a positive electrode active material on both the surfaces was changed from 50 μm into 140 μm in the production of a positive electrode and the target value of total thickness of a coating of slurry containing a negative electrode active material on both the surfaces was changed from 45 μm into 125 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S7 are shown in Table 1 described below.

Example 8

S8

A laminated outer lithium ion capacitor for a test (hereinafter referred to as "cell S8") was produced in the same manner as in Example 1 except that the target value of total thickness of a coating of slurry containing a positive electrode active material on both the surfaces was changed from 50 μm into 140 μm in the production of a positive electrode and the target value of total thickness of a coating of slurry containing a negative electrode active material on both the surfaces was changed from 45 μm into 85 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S8 are shown in Table 1 described below.

Example 9

S9

A laminated outer lithium ion capacitor for a test (hereinafter referred to as "cell S9") was produced in the same manner as in Example 1 except that the amount of the lithium electrode was increased and the potential of the positive electrode after short-circuiting was 0.40 in the production of a lithium ion capacitor component. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S9 are shown in Table 1 described below.

Example 10

S10

A laminated outer lithium ion capacitor for a test (hereinafter referred to as "cell S10") was produced in the same manner as in Example 2 except that the amount of the lithium electrode was decreased and the potential of the positive electrode after short-circuiting was 1.65 in the production of a lithium ion capacitor component.

The total thickness of the positive electrode active material layer, the total thickness of the negative electrode active material layer, the positive electrode ratio, and the potential of the positive electrode after short-circuiting of the resulting cell S10 are shown in Table 1 described below.

Example 11

S11

A laminated outer lithium ion capacitor for a test (hereinafter referred to as "cell S11") was produced in the same manner as in Example 3 except that a mixed solvent of ethylene carbonate, ethyl methyl carbonate, and dimethyl carbonate at a volume ratio of 1:1:1 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S11 are shown in Table 1 described below.

Example 12

S12

A laminated outer lithium ion capacitor for a test (hereinafter referred to as "cell S12") was produced in the same manner as in Example 3 except that a mixed solvent of ethylene carbonate, ethyl methyl carbonate, and dimethyl carbonate at a volume ratio of 1:1.5:0.5 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S12 are shown in Table 1 described below.

Example 13

S13

A laminated outer lithium ion capacitor for a test (hereinafter referred to as "cell S13") was produced in the same manner as in Example 3 except that a mixed solvent of ethylene carbonate, ethyl methyl carbonate, and dimethyl carbonate at a volume ratio of 1:1.5:1.5 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S13 are shown in Table 1 described below.

Example 14

S14

A laminated outer lithium ion capacitor for a test (hereinafter referred to as "cell S14") was produced in the same manner as in Example 3 except that a mixed solvent of ethylene carbonate, ethyl methyl carbonate, and dimethyl carbonate at a volume ratio of 1:2.7:0.3 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S14 are shown in Table 1 described below.

Example 15

S15

A laminated outer lithium ion capacitor for a test (hereinafter referred to as "cell S15") was produced in the same manner as in Example 3 except that a mixed solvent of ethylene carbonate, ethyl methyl carbonate, and dimethyl carbonate at a volume ratio of 1:0.5:0.5 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S15 are shown in Table 1 described below.

Example 16

S16

A laminated outer lithium ion capacitor for a test (hereinafter referred to as "cell S16") was produced in the same manner as in Example 3 except that a mixed solvent of ethylene carbonate, ethyl methyl carbonate, and dimethyl carbonate at a volume ratio of 1:0.9:0.1 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S16 are shown in Table 1 described below.

Example 17

S17

A laminated outer lithium ion capacitor for a test (hereinafter referred to as "cell S17") was produced in the same manner as in Example 3 except that a mixed solvent of ethylene carbonate, ethyl methyl carbonate, and dimethyl carbonate at a volume ratio of 1:2:2 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S17 are shown in Table 1 described below.

Example 18

S18

A laminated outer lithium ion capacitor for a test (hereinafter referred to as "cell S18") was produced in the same manner as in Example 3 except that a mixed solvent of ethylene carbonate, ethyl methyl carbonate, and dimethyl carbonate at a volume ratio of 1:0.25:0.25 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S18 are shown in Table 1 described below.

Example 19

S19

A laminated outer lithium ion capacitor for a test (hereinafter referred to as "cell S19") was produced in the same manner as in Example 3 except that a mixed solvent of ethylene carbonate and ethyl methyl carbonate at a volume ratio of 1:4 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S19 are shown in Table 1 described below.

Example 20

S20

A laminated outer lithium ion capacitor for a test (hereinafter referred to as "cell S20") was produced in the same manner as in Example 3 except that a mixed solvent of ethylene carbonate and ethyl methyl carbonate at a volume ratio of 1:0.5 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S20 are shown in Table 1 described below.

Example 21

S21

A laminated outer lithium ion capacitor for a test (hereinafter referred to as "cell S21") was produced in the same manner as in Example 3 except that a mixed solvent of ethylene carbonate and diethyl carbonate at a volume ratio of 1:1 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S21 are shown in Table 1 described below.

Example 22

S22

A laminated outer lithium ion capacitor for a test (hereinafter referred to as "cell S22") was produced in the same manner as in Example 11 except that graphite was used as a negative electrode active material instead of graphite-based composite particles (1) in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S22 are shown in Table 1 described below.

Example 23

S23

A laminated outer lithium ion capacitor for a test (hereinafter referred to as "cell S23") was produced in the same manner as in Example 3 except that a current collector material (porosity: 40%) in which through-holes with a pore diameter of 300 µm was formed by punching of a diameter of 0.3 mm on an aluminum electrolytically etched foil with a void ratio of 10% and a thickness of 30 µm was used in the production of a positive electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S23 are shown in Table 1 described below.

Example 24

S24

A laminated outer lithium ion capacitor for a test (hereinafter referred to as "cell S24") was produced in the same manner as in Example 11 except that a current collector material (porosity: 40%) in which through-holes with a pore diameter of 300 µm was formed by punching of a diameter of 0.3 mm on an aluminum electrolytically etched foil with a void ratio of 10% and a thickness of 30 µm was used in the production of a positive electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S24 are shown in Table 1 described below.

Example 25

S25

A laminated outer lithium ion capacitor for a test (hereinafter referred to as "cell S25") was produced in the same manner as in Example 3 except that a current collector material (porosity: 40%) in which an aluminum electrolytically etched foil with a void ratio of 10% and a thickness of 30 µm was subjected to expanding process was used in the production of a positive electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell S25 are shown in Table 1 described below.

Comparative Example 1

C1

A laminated outer lithium ion capacitor for a test (hereinafter referred to as "cell C1") was produced in the same manner as in Example 1 except that the target value of total thickness of a coating of slurry containing a positive electrode active material on both the surfaces was changed from 50 µm into 40 µm in the production of a positive electrode and the target value of total thickness of a coating of slurry containing a negative electrode active material on both the surfaces was changed from 45 µm into 30 µm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C1 are shown in Table 2 described below.

Comparative Example 2

C2

A laminated outer lithium ion capacitor for a test (hereinafter referred to as "cell C2") was produced in the same manner as in Example 1 except that the target value of total thickness of a coating of slurry containing a positive electrode active material on both the surfaces was changed from 50 µm into 195 µm in the production of a positive electrode and the target value of total thickness of a coating of slurry containing a negative electrode active material on both the surfaces was changed from 45 µm into 140 µm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C2 are shown in Table 2 described below.

Comparative Example 3

C3

A laminated outer lithium ion capacitor for a test (hereinafter referred to as "cell C3") was produced in the same manner as in Example 1 except that the target value of total thickness of a coating of slurry containing a positive electrode active material on both the surfaces was changed from 50 µm into 80 µm in the production of a positive electrode and the target value of total thickness of a coating of slurry containing a negative electrode active material on both the surfaces was changed from 45 µm into 80 µm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C3 are shown in Table 2 described below.

Comparative Example 4

C4

A laminated outer lithium ion capacitor for a test (hereinafter referred to as "cell C4") was produced in the same manner as in Example 1 except that the target value of total thickness of a coating of slurry containing a positive electrode active material on both the surfaces was changed from 50 μm into 80 μm in the production of a positive electrode and the target value of total thickness of a coating of slurry containing a negative electrode active material on both the surfaces was changed from 45 μm into 40 μm in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C4 are shown in Table 2 described below.

Comparative Example 5

C5

A laminated outer lithium ion capacitor for a test (hereinafter referred to as "cell C5") was produced in the same manner as in Example 1 except that an expanded metal made of aluminum (porosity: 45%) that was not roughened and had a thickness of 30 μm was used as a positive current collector in the production of a positive electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C5 are shown in Table 2 described below.

Comparative Example 6

C6

A laminated outer lithium ion capacitor for a test (hereinafter referred to as "cell C6") was produced in the same manner as in Example 1 except that hard carbon was used as a negative electrode active material instead of graphite-based composite particles (1) in the production of a negative electrode. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C6 are shown in Table 2 described below.

Comparative Example 7

C7

A laminated outer lithium ion capacitor for a test (hereinafter referred to as "cell C7") was produced in the same manner as in Comparative Example 3 except that a mixed solvent of ethylene carbonate, ethyl methyl carbonate, and dimethyl carbonate at a volume ratio of 1:1:1 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C7 are shown in Table 2 described below.

Comparative Example 8

C8

A laminated outer lithium ion capacitor for a test (hereinafter referred to as "cell C8") was produced in the same manner as in Comparative Example 2 except that a mixed solvent of ethylene carbonate, ethyl methyl carbonate, and dimethyl carbonate at a volume ratio of 1:1:1 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C8 are shown in Table 2 described below.

Comparative Example 9

C9

A laminated outer lithium ion capacitor for a test (hereinafter referred to as "cell C9") was produced in the same manner as in Comparative Example 6 except that a mixed solvent of ethylene carbonate, ethyl methyl carbonate, and dimethyl carbonate at a volume ratio of 1:1:1 was used as an aprotic organic solvent of an electrolytic solution. The potential of the positive electrode after short-circuiting was measured.

The total thickness of the positive electrode active material layer, the total thickness of the negative electrode active material layer, the positive electrode ratio, and the potential of the positive electrode after short-circuiting of the resulting cell C9 are shown in Table 2 described below.

<Evaluation of Lithium Ion Capacitor>

The cells S1 to S25 and C1 to C9 were each subjected to energy density measurement, alternating current internal resistance measurement, and charge and discharge cycle test, which will be described below, and the characteristic properties were evaluated.

[Energy Density Measurement]

The produced cells S1 to S25 and C1 to C9 were each charged at an electric current of 10 A to an electric voltage of 3.8 V, held for 30 minutes at the same electric voltage, and then discharged at an electric current of 10 A to an electric voltage of 2.2 V. At this time, the capacity was measured. This capacity as an energy of the capacitor was divided by the volume of the capacitor to determine an energy density (Wh/L). The results are shown in Tables 1 and 2.

[Alternating Current Internal Resistance Measurement]

The alternating current internal resistance (RC) of each of the produced cells S1 to S25 and C1 to C9 at 1 kHz under the environment of 25° C.±5° C. was measured at a measurement temperature of 25° C. with "AC mΩ Hi Tester 3560" manufactured by HIOKI E.E. CORPORATION. The results are shown in Tables 1 and 2.

[Charge and Discharge Cycle Test]

The produced cells S1 to S25 and C1 to C9 were each subjected to charge and discharge cycle 100,000 times at 25° C. and a current density of 100 C. The capacity retention rate (%) and the resistance increase rate (%) based on the capacity and the resistance at a first cycle were measured. The results are shown in Tables 1 and 2.

The capacity retention rate and the resistance increase rate are defined as follows.

[Definition of Capacity Retention Rate]

The measured capacity of a lithium ion capacitor at the first cycle is assumed to be 100%, and the retention rate of the capacity of the lithium ion capacitor at the 100,000th cycle is measured.

[Definition of Resistance Increase Rate]

The measured alternating current internal resistance (RC) of a lithium ion capacitor at the first cycle is assumed to be 100%, and the increase rate of the alternating current internal resistance (RC) of the lithium ion capacitor at the 100,000th cycle is measured.

[Synthetic Judgment]

Synthetic judgments of the results of the above-described tests were performed by the following criteria for evaluation. The results are shown in Tables 1 and 2.

(Evaluation Criteria)

A case where the following conditions (a) to (d) are all satisfied is expressed as A, a case where any one of the conditions is not satisfied is expressed as B, and a case where any two of the conditions are not satisfied is expressed as C.
(a) energy density falls within a range of 10 Wh/L to 20 Wh/L
(b) alternating current internal resistance (RC) falls within a range of 0.1 $\Omega F$ to 0.9 $\Omega F$
(c) a value of charge and discharge cycle falls within a range of 95% to 100%
(d) resistance increase rate (%) falls within a range of 100% to 110%

TABLE 1

| CELL | POSITIVE ELECTRODE CURRENT COLLECTOR MATERIAL | NEGATIVE ELECTRODE ACTIVE MATERIAL | TOTAL THICKNESS OF POSITIVE ELECTRODE ACTIVE MATERIAL LAYER [μm] | TOTAL THICKNESS OF NEGATIVE ELECTRODE ACTIVE MATERIAL LAYER [μm] |
|---|---|---|---|---|
| S1 | ELECTROLYTICALLY ETCHED FOIL | GRAPHITE-BASED COMPOSITE PARTICLES(1) | 50 | 45 |
| S2 | ELECTROLYTICALLY ETCHED FOIL | GRAPHITE-BASED COMPOSITE PARTICLES(1) | 50 | 30 |
| S3 | ELECTROLYTICALLY ETCHED FOIL | GRAPHITE-BASED COMPOSITE PARTICLES(1) | 80 | 60 |
| S4 | ELECTROLYTICALLY ETCHED FOIL | GRAPHITE-BASED COMPOSITE PARTICLES(1) | 80 | 50 |
| S5 | ELECTROLYTICALLY ETCHED FOIL | GRAPHITE-BASED COMPOSITE PARTICLES(1) | 110 | 85 |
| S6 | ELECTROLYTICALLY ETCHED FOIL | GRAPHITE-BASED COMPOSITE PARTICLES(1) | 110 | 70 |
| S7 | ELECTROLYTICALLY ETCHED FOIL | GRAPHITE-BASED COMPOSITE PARTICLES(1) | 140 | 125 |
| S8 | ELECTROLYTICALLY ETCHED FOIL | GRAPHITE-BASED COMPOSITE PARTICLES(1) | 140 | 85 |
| S9 | ELECTROLYTICALLY ETCHED FOIL | GRAPHITE-BASED COMPOSITE PARTICLES(1) | 50 | 45 |
| S10 | ELECTROLYTICALLY ETCHED FOIL | GRAPHITE-BASED COMPOSITE PARTICLES(1) | 50 | 30 |
| S11 | ELECTROLYTICALLY ETCHED FOIL | GRAPHITE-BASED COMPOSITE PARTICLES(1) | 80 | 60 |
| S12 | ELECTROLYTICALLY ETCHED FOIL | GRAPHITE-BASED COMPOSITE PARTICLES(1) | 80 | 60 |
| S13 | ELECTROLYTICALLY ETCHED FOIL | GRAPHITE-BASED COMPOSITE PARTICLES(1) | 80 | 50 |
| S14 | ELECTROLYTICALLY ETCHED FOIL | GRAPHITE-BASED COMPOSITE PARTICLES(1) | 80 | 60 |
| S15 | ELECTROLYTICALLY ETCHED FOIL | GRAPHITE-BASED COMPOSITE PARTICLES(1) | 80 | 60 |
| S16 | ELECTROLYTICALLY ETCHED FOIL | GRAPHITE-BASED COMPOSITE PARTICLES(1) | 80 | 60 |
| S17 | ELECTROLYTICALLY ETCHED FOIL | GRAPHITE-BASED COMPOSITE PARTICLES(1) | 80 | 60 |
| S18 | ELECTROLYTICALLY ETCHED FOIL | GRAPHITE-BASED COMPOSITE PARTICLES(1) | 80 | 60 |
| S19 | ELECTROLYTICALLY ETCHED FOIL | GRAPHITE-BASED COMPOSITE PARTICLES(1) | 80 | 60 |
| S20 | ELECTROLYTICALLY ETCHED FOIL | GRAPHITE-BASED COMPOSITE PARTICLES(1) | 80 | 60 |
| S21 | ELECTROLYTICALLY ETCHED FOIL | GRAPHITE-BASED COMPOSITE PARTICLES(1) | 80 | 60 |
| S22 | ELECTROLYTICALLY ETCHED FOIL | GRAPHITE | 80 | 60 |
| S23 | ELECTROLYTICALLY ETCHED FOIL (PUNCHING) | GRAPHITE-BASED COMPOSITE PARTICLES(1) | 80 | 60 |
| S24 | ELECTROLYTICALLY ETCHED FOIL (PUNCHING) | GRAPHITE-BASED COMPOSITE PARTICLES(1) | 80 | 60 |
| S25 | ELECTROLYTICALLY ETCHED FOIL (EXPANDING) | GRAPHITE-BASED COMPOSITE PARTICLES(1) | 80 | 60 |

| CELL | COMPOSITION OF APROTIC ORGANIC SOLVENT (VOLUME RATIO) | | | | | POSITIVE ELECTRODE RATIO | POTENTIAL OF POSITIVE ELECTRODE AFTER SHORT-CIRCUITING [V] | ENERGY DENSITY [Wh/L] | RC [ΩF] | AFTER 100,000 CYCLES | | SYNTHETIC JUDGMENT |
|---|---|---|---|---|---|---|---|---|---|---|---|---|
| | EC | PC | EMC | DMC | DEC | | | | | CAPACITY RETENTION RATE [%] | RESISTANCE INCREASE RATE [%] | |
| S1 | 3 | 1 | — | — | 4 | 0.40 | 0.75 | 10.5 | 0.32 | 96 | 104 | A |
| S2 | 3 | 1 | — | — | 4 | 0.50 | 0.90 | 11.2 | 0.32 | 97 | 105 | A |
| S3 | 3 | 1 | — | — | 4 | 0.43 | 0.85 | 13.8 | 0.50 | 97 | 106 | A |
| S4 | 3 | 1 | — | — | 4 | 0.48 | 1.10 | 14.3 | 0.50 | 96 | 107 | A |
| S5 | 3 | 1 | — | — | 4 | 0.43 | 0.90 | 16.2 | 0.70 | 96 | 107 | A |
| S6 | 3 | 1 | — | — | 4 | 0.48 | 1.15 | 17.0 | 0.70 | 96 | 108 | A |
| S7 | 3 | 1 | — | — | 4 | 0.40 | 0.90 | 17.3 | 0.90 | 95 | 107 | A |
| S8 | 3 | 1 | — | — | 4 | 0.50 | 1.20 | 19.4 | 0.89 | 95 | 109 | A |
| S9 | 3 | 1 | — | — | 4 | 0.40 | 0.40 | 10.5 | 0.32 | 94 | 108 | B |
| S10 | 3 | 1 | — | — | 4 | 0.50 | 1.65 | 11.2 | 0.32 | 93 | 104 | B |
| S11 | 1 | — | 1 | 1 | — | 0.43 | 0.85 | 13.8 | 0.34 | 98 | 103 | A |
| S12 | 1 | — | 1.5 | 0.5 | — | 0.43 | 0.85 | 13.8 | 0.36 | 98 | 104 | A |

TABLE 1-continued

| | | | | | | | | | | | | |
|---|---|---|---|---|---|---|---|---|---|---|---|---|
| S13 | 1 | — | 1.5 | 1.5 | — | 0.43 | 0.85 | 13.8 | 0.38 | 98 | 104 | A |
| S14 | 1 | — | 2.7 | 0.3 | — | 0.43 | 0.85 | 13.8 | 0.39 | 98 | 105 | A |
| S15 | 1 | — | 0.5 | 0.5 | — | 0.43 | 0.85 | 13.8 | 0.43 | 98 | 104 | A |
| S16 | 1 | — | 0.9 | 0.1 | — | 0.43 | 0.85 | 13.8 | 0.46 | 98 | 104 | A |
| S17 | 1 | — | 2 | 2 | — | 0.43 | 0.85 | 13.8 | 0.51 | 97 | 106 | A |
| S18 | 1 | — | 0.25 | 0.25 | — | 0.43 | 0.85 | 13.8 | 0.51 | 96 | 106 | A |
| S19 | 1 | — | 4 | — | — | 0.43 | 0.85 | 13.8 | 0.51 | 95 | 108 | A |
| S20 | 1 | — | 0.5 | — | — | 0.43 | 0.85 | 13.8 | 0.54 | 96 | 107 | A |
| S21 | 1 | — | — | — | 1 | 0.43 | 0.85 | 13.8 | 0.50 | 95 | 109 | A |
| S22 | 1 | — | 1 | 1 | — | 0.43 | 0.85 | 13.8 | 0.41 | 95 | 112 | B |
| S23 | 3 | 1 | — | — | 4 | 0.43 | 0.85 | 13.9 | 0.54 | 97 | 106 | A |
| S24 | 1 | — | 1 | 1 | — | 0.43 | 0.85 | 13.9 | 0.38 | 98 | 103 | A |
| S25 | 3 | 1 | — | — | 4 | 0.43 | 0.85 | 13.9 | 0.54 | 97 | 106 | A |

TABLE 2

| CELL | POSITIVE ELECTRODE CURRENT COLLECTOR MATERIAL | NEGATIVE ELECTRODE ACTIVE MATERIAL | TOTAL THICKNESS OF POSITIVE ELECTRODE ACTIVE MATERIAL LAYER [μm] | TOTAL THICKNESS OF NEGATIVE ELECTRODE ACTIVE MATERIAL LAYER [μm] |
|---|---|---|---|---|
| C1 | ELECTROLYTICALLY ETCHED FOIL | GRAPHITE-BASED COMPOSITE PARTICLES(1) | 40 | 30 |
| C2 | ELECTROLYTICALLY ETCHED FOIL | GRAPHITE-BASED COMPOSITE PARTICLES(1) | 195 | 140 |
| C3 | ELECTROLYTICALLY ETCHED FOIL | GRAPHITE-BASED COMPOSITE PARTICLES(1) | 80 | 80 |
| C4 | ELECTROLYTICALLY ETCHED FOIL | GRAPHITE-BASED COMPOSITE PARTICLES(1) | 80 | 40 |
| C5 | EXPANDED METAL | GRAPHITE-BASED COMPOSITE PARTICLES(1) | 50 | 45 |
| C6 | ELECTROLYTICALLY ETCHED FOIL | HARD CARBON | 50 | 45 |
| C7 | ELECTROLYTICALLY ETCHED FOIL | GRAPHITE-BASED COMPOSITE PARTICLES(1) | 80 | 80 |
| C8 | ELECTROLYTICALLY ETCHED FOIL | GRAPHITE-BASED COMPOSITE PARTICLES(1) | 195 | 140 |
| C9 | ELECTROLYTICALLY ETCHED FOIL | HARD CARBON | 50 | 50 |

| CELL | COMPOSITION OF APROTIC ORGANIC SOLVENT (VOLUME RATIO) | | | | | POSITIVE ELECTRODE RATIO | POTENTIAL OF POSITIVE ELECTRODE AFTER SHORT-CIRCUITING [V] | ENERGY DENSITY [Wh/L] | RC [QF] | AFTER 100,000 CYCLES | | SYNTHETIC JUDGMENT |
|---|---|---|---|---|---|---|---|---|---|---|---|---|
| | EC | PC | EMC | DMC | DEC | | | | | CAPACITY RETENTION RATE [%] | RESISTANCE INCREASE RATE [%] | |
| C1 | 3 | 1 | — | — | 4 | 0.46 | 0.80 | 9.4 | 0.26 | 97 | 104 | C |
| C2 | 3 | 1 | — | — | 4 | 0.46 | 1.05 | 20.8 | 1.25 | 94 | 112 | C |
| C3 | 3 | 1 | — | — | 4 | 0.37 | 0.60 | 12.9 | 0.50 | 94 | 111 | C |
| C4 | 3 | 1 | — | — | 4 | 0.53 | 1.25 | 14.8 | 0.50 | 93 | 115 | C |
| C5 | 3 | 1 | — | — | 4 | 0.40 | 0.75 | 10.5 | 0.94 | 96 | 113 | C |
| C6 | 3 | 1 | — | — | 4 | 0.40 | 0.80 | 10.5 | 0.91 | 94 | 108 | C |
| C7 | 1 | — | 1 | 1 | — | 0.37 | 0.60 | 12.9 | 0.32 | 94 | 111 | C |
| C8 | 1 | — | 1 | 1 | — | 0.46 | 1.05 | 20.8 | 0.51 | 94 | 111 | C |
| C9 | 1 | — | 1 | 1 | — | 0.40 | 0.80 | 10.5 | 0.44 | 93 | 112 | C |

As shown in the results of Table 1, the cells S1 to S8 satisfy the preferred conditions of the energy density, alternating current internal resistance (RC), capacity retention rate (%), and resistance increase rate (%). Therefore, favorable lithium ion capacitors are obtained.

The cells S9 and S10 have a low capacity retention rate, but do not have much influence on the performance of a lithium ion capacitor.

In the cells S11 to S16, the alternating current internal resistance (RC) is lower than that of the cell S3. This may be because the ratio of the volume of EC to the total volume of EMC and DMC is 1:3 to 1:1 and the ratio of the volume of EMC to that of DMC is 1:1 to 9:1.

Similarly to the cells S1 to S8, in the cells S17 to S21, favorable lithium ion capacitors are obtained.

The cell S22 has a slightly high resistance increase rate due to the use of graphite as a negative electrode active material, but does not have much influence on the performance of a lithium ion capacitor.

In the cells S23 to S25, an electrolytically etched foil that had been subjected to punching or expanding by post-processing was used as a positive electrode current collector, but favorable characteristic properties similar to those of a lithium ion capacitor using an electrolytically etched foil are obtained.

As shown in the results of Table 2, in the cell C1, the total thickness of the positive electrode active material layer is less than the range of 50 μm to 140 μm, and therefore the energy density becomes small.

In the cell C2, the total thickness of the positive electrode active material layer is more than the range of 50 µm to 140 µm, and therefore the alternating current internal resistance (RC) and the resistance increase rate are high, and the capacity retention rate becomes low.

In the cell C3, the positive electrode ratio is less than the range of 0.4 to 0.5, and therefore the resistance increase rate is high, and the capacity retention rate is lowered.

In the cell C4, the positive electrode ratio is more than the range of 0.4 to 0.5, and therefore the resistance increase rate is high, and the capacity retention rate is lowered.

In the cell C5, the expanded metal without roughening was used as a positive electrode current collector, and therefore the alternating current internal resistance (RC) and the resistance increase rate are high.

In the cell C6, hard carbon was used as a negative electrode active material, and therefore the alternating current internal resistance (RC) is high, and the capacity retention rate is lowered.

In the cell C7, the mixed solvent of EC, EMC, and DMC at a volume ratio of 1:1:1 was used as an electrolytic solution, but the positive electrode ratio is less than the range of 0.4 to 0.5. Therefore, the resistance increase rate is high, and the capacity retention rate is lowered.

In the cell C8, the mixed solvent of EC, EMC, and DMC at a volume ratio of 1:1:1 was used as an electrolytic solution, but the total thickness of the positive electrode active material layer is more than the range of 50 µm to 140 µm. Therefore, the alternating current internal resistance (RC) and the resistance increase rate are high, and the capacity retention rate is lowered.

In the cell C9, the mixed solvent of EC, EMC, and DMC at a volume ratio of 1:1:1 was used as an electrolytic solution, but hard carbon was used as a negative electrode active material. Therefore, the resistance increase rate is high, and the capacity retention rate is lowered.

The invention claimed is:

1. A lithium ion capacitor comprising: a positive electrode having a positive electrode active material layer formed on a roughened positive electrode current collector; a negative electrode having a negative electrode active material layer containing graphite-based particles formed on a negative electrode current collector, and an electrolytic solution containing a solution of a lithium salt in an aprotic organic solvent, wherein a total thickness of the positive electrode active material layer is 50 µm to 140 µm, and a ratio of mass of the positive electrode active material layer to a sum of the mass of the positive electrode active material layer and that of the negative electrode active material layer is 0.4 to 0.5,
   wherein the graphite-based particles in the negative electrode active material layer are graphite-based composite particles of graphite powder coated with a material derived from tar or pitch.

2. The lithium ion capacitor according to claim 1, wherein the positive electrode current collector is roughened by etching.

3. The lithium ion capacitor according to claim 1, wherein the positive electrode current collector is roughened by electrolytic etching.

4. The lithium ion capacitor according to claim 1, 2 or 3, wherein when the negative electrode and/or the positive electrode are/is doped with lithium ions and the positive electrode and the negative electrode are then short-circuited, a potential of the positive electrode is 0.5 to 1.5 V.

5. The lithium ion capacitor according to claim 1, wherein the aprotic organic solvent is a mixed solvent of ethylene carbonate, ethyl methyl carbonate, and dimethyl carbonate, and a ratio of volume of ethylene carbonate to a sum of volume of ethyl methyl carbonate and that of dimethyl carbonate is 1:3 to 1:1.

6. The lithium ion capacitor according to claim 5, wherein in the aprotic organic solvent, a ratio of the volume of ethyl methyl carbonate to that of dimethyl carbonate is 1:1 to 9:1.

7. A lithium ion capacitor comprising: a positive electrode having a positive electrode active material layer formed on a roughened positive electrode current collector; a negative electrode having a negative electrode active material layer containing graphite-based particles formed on a negative electrode current collector, and an electrolytic solution containing a solution of a lithium salt in an aprotic organic solvent, wherein a total thickness of the positive electrode active material layer is 50 µm to 140 µm, and a ratio of mass of the positive electrode active material layer to a sum of the mass of the positive electrode active material layer and that of the negative electrode active material layer is 0.4 to 0.5, wherein the aprotic organic solvent is a mixed solvent of ethylene carbonate, ethyl methyl carbonate, and dimethyl carbonate, and a ratio of volume of ethylene carbonate to a sum of volume of ethyl methyl carbonate and that of dimethyl carbonate is 1:3 to 1:1.

8. The lithium ion capacitor according to claim 7, wherein in the aprotic organic solvent, a ratio of the volume of ethyl methyl carbonate to that of dimethyl carbonate is 1:1 to 9:1.

9. The lithium ion capacitor according to claim 7, wherein the positive electrode current collector is roughened by etching.

10. The lithium ion capacitor according to claim 7, wherein the positive electrode current collector is roughened by electrolytic etching.

11. The lithium ion capacitor according to claim 7, 8, 9 or 10, wherein when the negative electrode and/or the positive electrode are/is doped with lithium ions and the positive electrode and the negative electrode are then short-circuited, a potential of the positive electrode is 0.5 to 1.5 V.

* * * * *